US012761533B2

(12) United States Patent
Tanaka et al.

(10) Patent No.: US 12,761,533 B2

(45) Date of Patent: Oct. 13, 2026

(54) ATTACHMENT STRUCTURE OF IMAGING DEVICE

(71) Applicant: HONDA MOTOR CO., LTD., Tokyo (JP)

(72) Inventors: Yuhei Tanaka, Tokyo (JP); Shingo Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 19/051,650

(22) Filed: Feb. 12, 2025

(65) Prior Publication Data

US 2025/0291234 A1 Sep. 18, 2025

(30) Foreign Application Priority Data

Mar. 18, 2024 (JP) ................................ 2024-042179

(51) Int. Cl.
*G03B 17/02* (2021.01)
*H04N 23/51* (2023.01)

(52) U.S. Cl.
CPC ............ *G03B 17/02* (2013.01); *H04N 23/51* (2023.01)

(58) Field of Classification Search
CPC ........ H04N 23/51; G03B 17/56; G03B 17/02; G03B 30/00; B60R 11/0211; B60R 11/00; B60R 2011/004; B60R 2011/005
See application file for complete search history.

(56) References Cited

U.S. PATENT DOCUMENTS

| | | | | |
|---|---|---|---|---|
| 12,043,185 | B2 * | 7/2024 | Yamaoka | B60R 11/04 |
| 12,054,174 | B2 | 8/2024 | Yoneyama | |
| 12,466,335 | B2 * | 11/2025 | Nakayama | B60R 11/04 |
| 2008/0284850 | A1 * | 11/2008 | Blaesing | B60S 1/0844 348/148 |
| 2025/0115193 | A1 * | 4/2025 | Inbe | B60R 11/04 |

FOREIGN PATENT DOCUMENTS

| | | | | |
|---|---|---|---|---|
| JP | 2018-103812 | * | 7/2018 | B60R 1/00 |
| JP | 2021-041791 | * | 3/2021 | B60R 11/02 |
| JP | 2022039110 A | | 3/2022 | |

* cited by examiner

*Primary Examiner* — Kelly L Jerabek
(74) *Attorney, Agent, or Firm* — Armstrong Teasdale LLP

(57) ABSTRACT

An attachment structure of an imaging device includes the imaging device, and a housing that accommodates at least a portion of the imaging device. The imaging device includes a lens that faces forward and laterally outward. The housing includes a circumferential wall arranged around the lens. The circumferential wall includes a front wall arranged forward of an optical axis of the lens, and a rear wall arranged rearward of the optical axis of the lens. In a case where a direction parallel to the optical axis of the lens and going forward and laterally outward is defined as an outboard direction and a tip side in the outboard direction is defined as an outboard side, a tip of the front wall on the outboard side is arranged on the outboard side relative to a tip of the rear wall on the outboard side in the plan view.

8 Claims, 9 Drawing Sheets

ATTACHMENT STRUCTURE OF IMAGING DEVICE

TECHNICAL FIELD

The present invention relates to an attachment structure of an imaging device.

BACKGROUND ART

In recent years, efforts have been actively made to provide access to sustainable transportation systems that take into account people in vulnerable situations among traffic participants. To achieve this, research and development for further improving safety and convenience of traffic through development of preventive safety technologies is attracting attention.

For example, JP2022-39110A discloses a vehicle including a pair of left and right roof camera devices mounted on a roof panel. The roof camera devices described in JP2022-39110A include a telephoto camera unit and a wide-angle camera unit (an imaging device), and a cover portion (a housing) that covers the telephoto camera unit and the wide-angle camera unit from above.

When the imaging device is arranged outside the vehicle as in JP2022-39110A, there is a demand to provide the housing with a circumferential wall arranged around a lens of the imaging device to protect the lens of the imaging device. In this case, a travel wind generated by the movement of the vehicle becomes a vortex at a front portion of the circumferential wall, and this vortex hits a rear portion of the circumferential wall. At this time, fluctuations in air pressure cause the air to vibrate, generating so-called wind noises. The wind noises reverberate inside the housing and are amplified, which may cause discomfort for the occupants.

SUMMARY OF THE INVENTION

In view of the above background, an object of the present invention is to provide an attachment structure of an imaging device that can suppress the generation of wind noises caused by the travel wind. This will ultimately contribute to the development of sustainable transportation systems.

To achieve such an object, one aspect of the present invention provides an attachment structure (10, 100, 200, 300) of an imaging device comprising: the imaging device (12) installed on a roof (2) of a vehicle (1); and a housing (13) that accommodates at least a portion of the imaging device, wherein the imaging device includes a lens (15) that faces forward and laterally outward of the vehicle, the housing includes a circumferential wall (21, 201, 301) arranged around the lens, the circumferential wall includes: a front wall (29, 202, 303) arranged forward of an optical axis (A) of the lens in a plan view; and a rear wall (30, 203, 302) arranged rearward of the optical axis of the lens in the plan view, and in a case where a direction parallel to the optical axis of the lens and going forward and laterally outward of the vehicle is defined as an outboard direction, and a tip side in the outboard direction is defined as an outboard side, a tip (29A, 202A, 303A) of the front wall on the outboard side is arranged on the outboard side relative to a tip (30A, 203A, 302A) of the rear wall on the outboard side in the plan view.

According to this aspect, even if a vortex is generated at the front wall of the circumferential wall by the travel wind, this vortex is less likely to hit the rear wall of the circumferential wall. Accordingly, the generation of the wind noises caused by the travel wind can be suppressed.

In the above aspect, preferably, the front wall is provided with a protrusion (31, 101) that protrudes toward the outboard side.

According to this aspect, the tip of the front wall on the outboard side protrudes significantly toward the outboard side relative to the tip of the rear wall on the outboard side. Accordingly, even if a vortex is generated at the front wall of the circumferential wall by the travel wind, this vortex is less likely to hit the rear wall of the circumferential wall. Accordingly, the generation of the wind noises caused by the travel wind can be more effectively suppressed.

In the above aspect, preferably, the protrusion is curved in an arc shape centered on the optical axis of the lens when viewed from the outboard side.

According to this aspect, since the protrusion is provided over a wider area of the front wall, the generation of the wind noises caused by the travel wind can be more effectively suppressed.

In the above aspect, preferably, the protrusion extends linearly in an up-and-down direction when viewed from the outboard side.

According to this aspect, since the protrusion is provided over a wider area of the front wall, the generation of the wind noises caused by the travel wind can be more effectively suppressed.

In the above aspect, preferably, a front surface (101A) of the protrusion is curved so as to be convex toward a rear in the plan view.

According to this aspect, since the travel wind is more likely to flow to the outboard side along the front surface of the protrusion, even if a vortex is generated at the front wall of the circumferential wall by the travel wind, this vortex is less likely to hit the rear wall of the circumferential wall. Accordingly, the generation of the wind noises caused by the travel wind can be more effectively suppressed.

In the above aspect, preferably, the circumferential wall protrudes toward the outboard side and in a circular shape centered on the optical axis of the lens.

According to this aspect, even if a vortex is generated at the front wall of the circumferential wall by the travel wind, this vortex is less likely to hit the rear wall of the circumferential wall.

In the above aspect, preferably, the front wall and the rear wall are curved in an arc shape toward the outboard side in the plan view, and a radius of curvature of the rear wall is greater than a radius of curvature of the front wall.

According to this aspect, with this simple configuration, the tip of the front wall on the outboard side can be arranged on the outboard side relative to the tip of the rear wall on the outboard side.

In the above aspect, preferably, in a case where a plane that is perpendicular to the optical axis of the lens and passes through the tip of the front wall on the outboard side is defined as a first plane (D1), and a plane that is perpendicular to the optical axis of the lens and passes through the tip of the rear wall on the outboard side is defined as a second plane (D2), the first plane is arranged on the outboard side relative to the second plane.

According to this aspect, a vortex generated at the front wall of the circumferential wall by the travel wind is less likely to hit the rear wall of the circumferential wall. Accordingly, the generation of the wind noises caused by the travel wind can be suppressed.

Thus, according to the above aspects, it is possible to provide an attachment structure of an imaging device that can suppress the generation of wind noises caused by the travel wind.

BRIEF DESCRIPTION OF THE DRAWING(S)

DETAILED DESCRIPTION OF THE INVENTION

The First Embodiment

Hereinafter, with reference to the drawings, a vehicle 1 provided with attachment structures (hereinafter referred to as "attachment structure(s) 10") of an imaging device 12 according to the first embodiment will be described.

Figure 1:
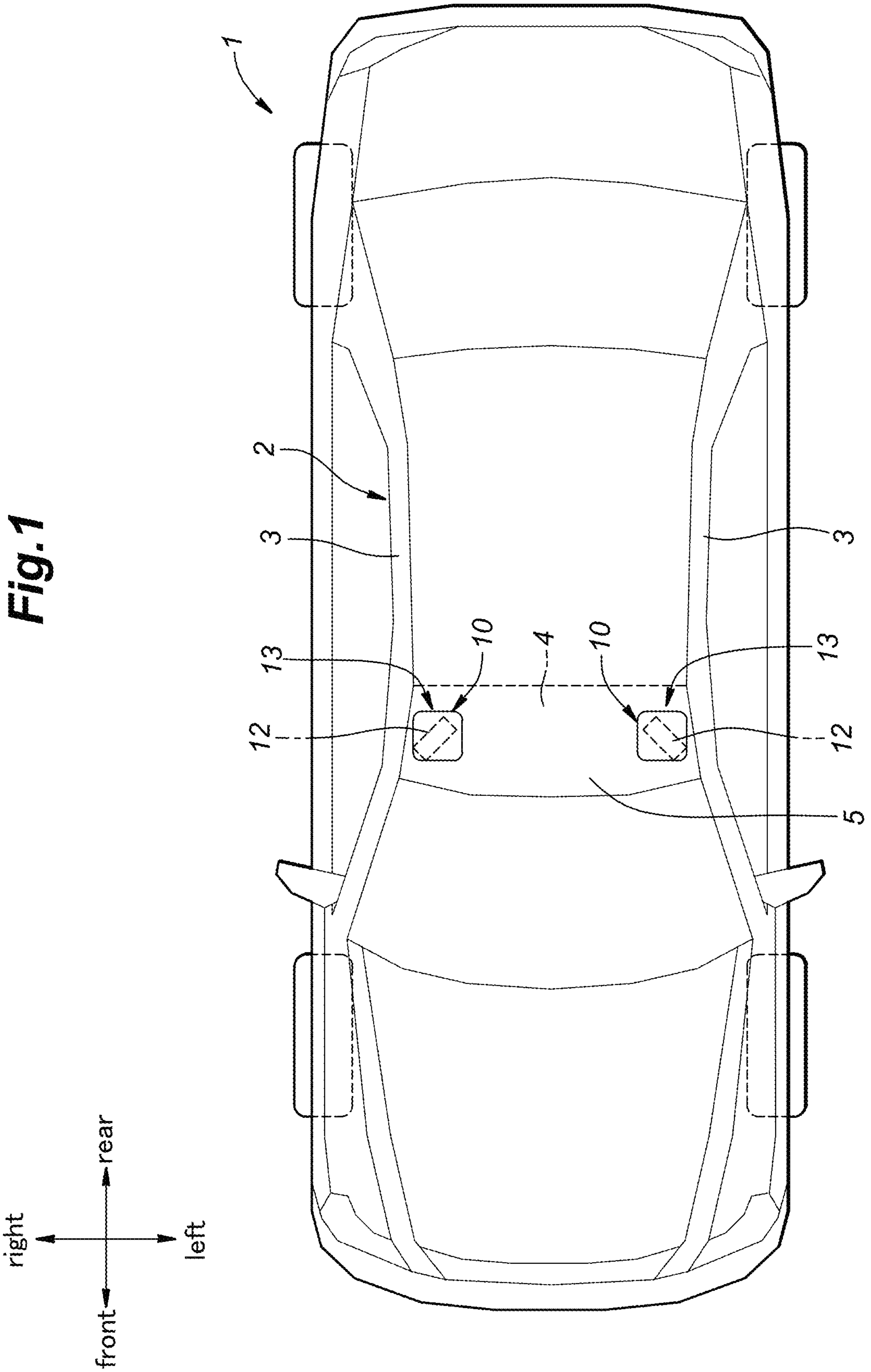
FIG. 1 is a plan view of a vehicle in which attachment structures of an imaging device according to the first embodiment is provided.

As shown in FIG. 1, the vehicle 1 is, for example, a four-wheeled automobile. The vehicle 1 includes an upper structure 2 (roof) that constitutes the upper portion of the vehicle 1. The upper structure 2 includes, for example, left and right roof side rails 3 extending in a front-and-rear direction of the vehicle 1 (hereinafter referred to simply as "the front-and-rear direction") and arranged on both the left and right sides of the vehicle 1, a roof rail 4 extending in a lateral direction of the vehicle 1 (hereinafter referred to simply as "the lateral direction") and stretched over the left and right roof side rails 3, and a roof panel 5 arranged above the roof rail 4.

A through hole 6 (see FIG. 3) penetrating in the up-and-down direction is formed in the roof rail 4. An annular grommet 7 (see FIG. 3) is attached to an edge of the roof rail 4 that defines the through hole 6.

Figure 2:
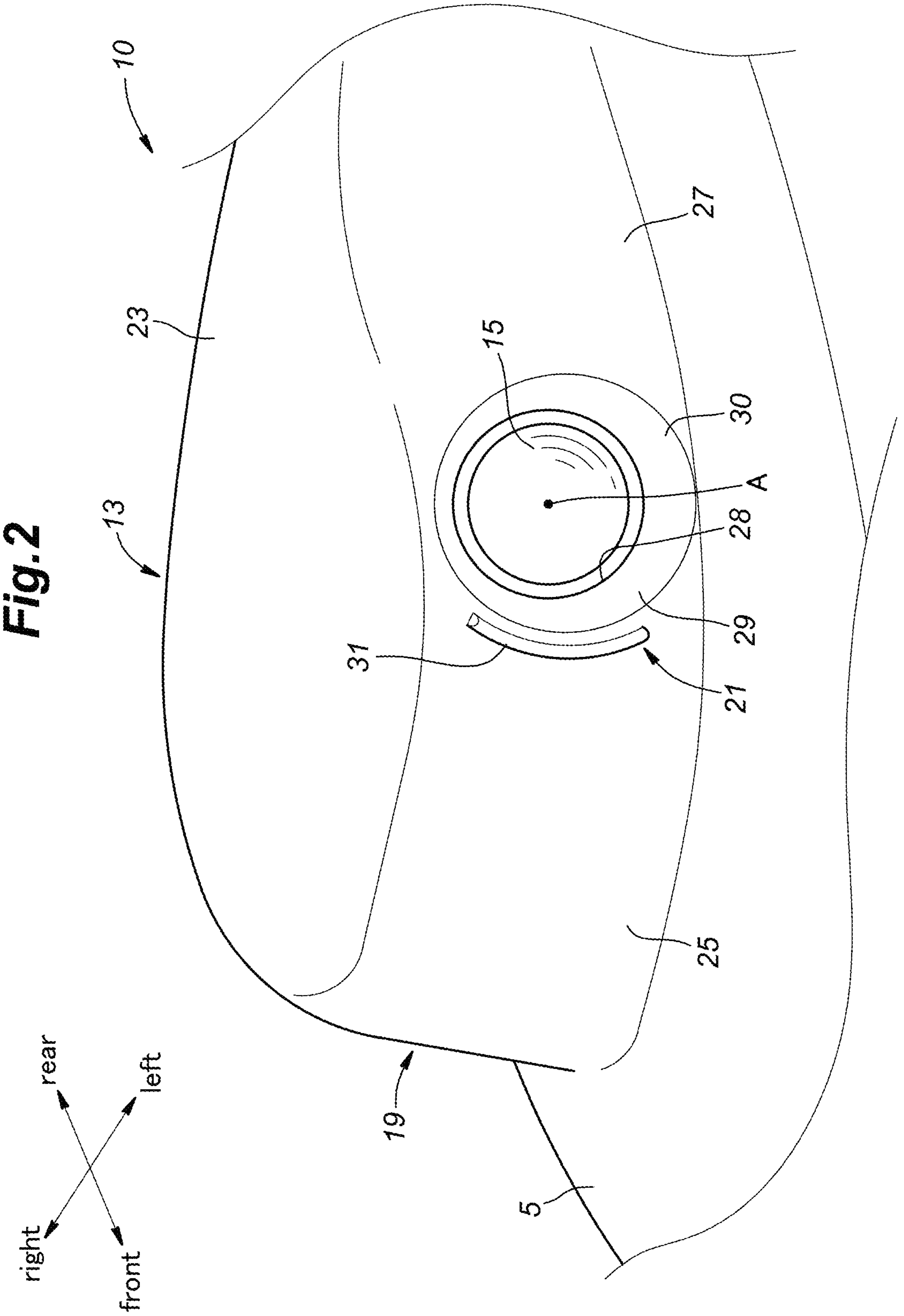
FIG. 2 is a perspective view showing the attachment structure of the imaging device according to the first embodiment.
Figure 3:
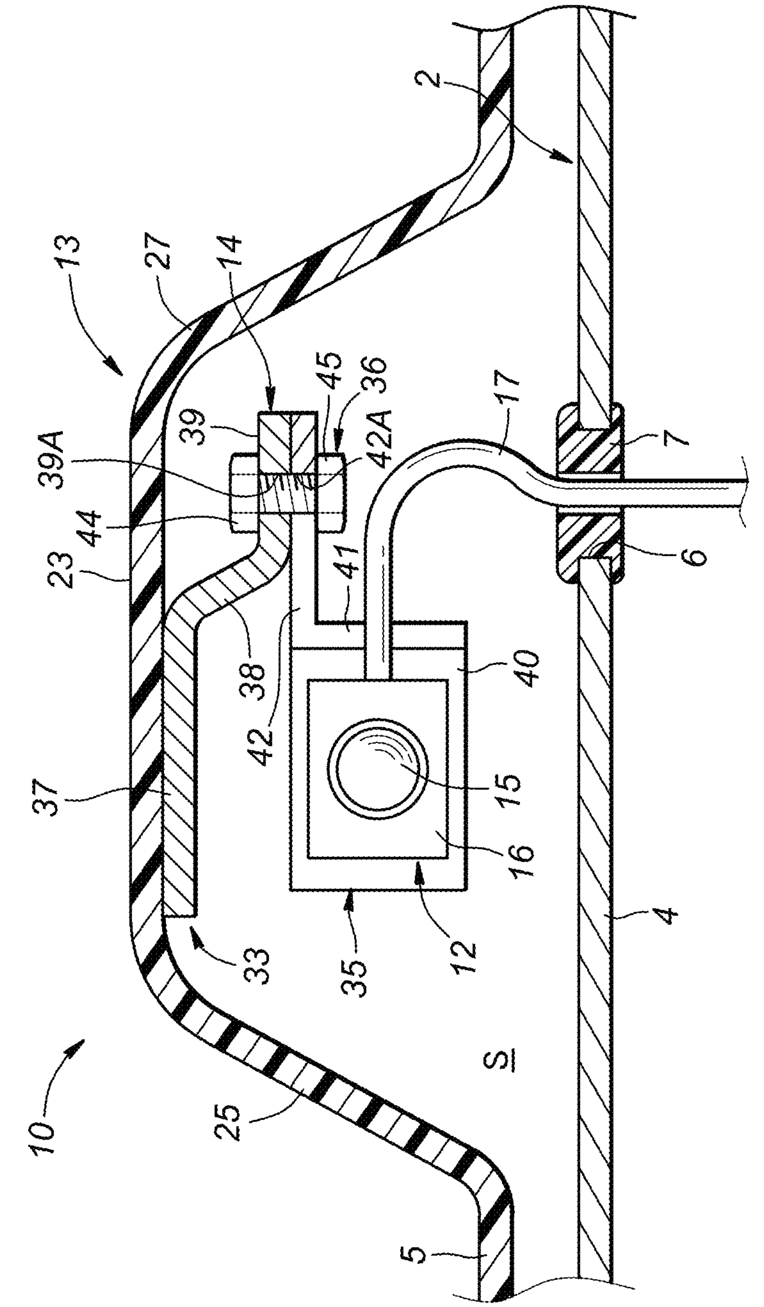
FIG. 3 is a cross-sectional view of the attachment structure of the imaging device according to the first embodiment viewed from an outboard side.

As shown in FIGS. 1 to 3, the attachment structures 10 are structures for arranging the imaging device 12 on the upper structure 2 of the vehicle 1. In the present embodiment, the attachment structures 10 are provided on the left and right front portions of the upper structure 2 of the vehicle 1. Since the left and right attachment structures 10 have the same configuration, only one of the left and right attachment structures 10 will be described below.

In the present embodiment, the attachment structure 10 includes the imaging device 12 mounted on the upper structure 2 of the vehicle 1, a housing 13 that accommodates the entire imaging device 12, and a fixed member 14 (see FIG. 3) for fixing the imaging device 12 to the housing 13. In another embodiment, the housing 13 may accommodate only a portion of the imaging device 12.

Figure 4:
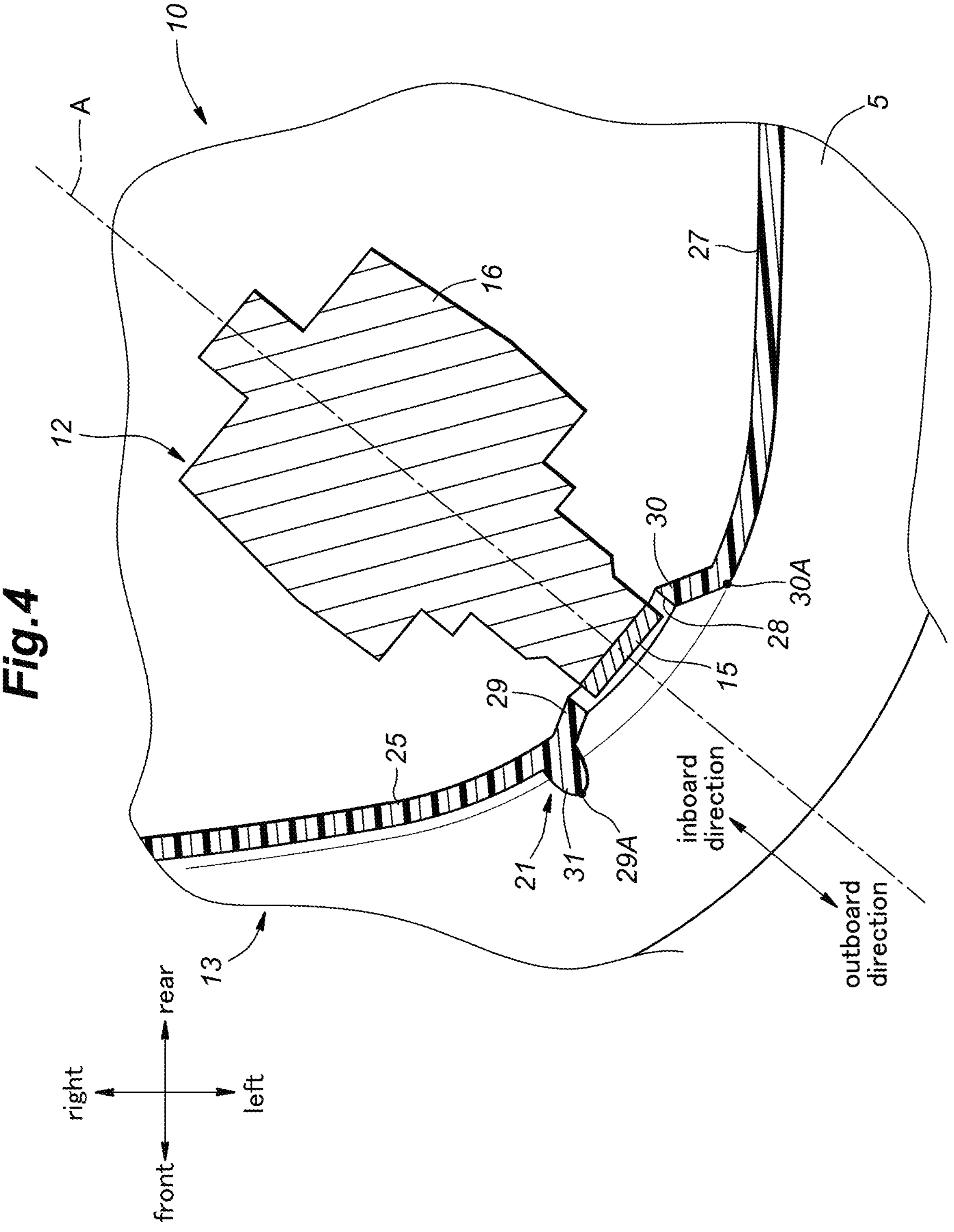
FIG. 4 is a plan cross-sectional view of a main portion of the attachment structure of the imaging device according to the first embodiment.

As shown in FIGS. 3 and 4, the imaging device 12 is a device that detects the conditions around the vehicle 1. The imaging device 12 is arranged above the roof rail 4. The imaging device 12 captures images of targets (surrounding vehicles such as a preceding vehicle, pedestrians, structures on a road, lane markings, or the like) existing around the vehicle 1. The imaging device 12 includes, for example, a lens 15 as an optical system, an image sensor (not shown) such as a Charge Coupled Device (CCD) or a Complementary Metal Oxide Semiconductor (CMOS), a casing 16 that accommodates the lens 15 and the image sensor, and a terminal (not shown) connected to the image sensor. The imaging device 12 captures images of the areas forward and laterally outward of the vehicle 1. That is, the lens 15 of the imaging device 12 is arranged to face forward and laterally outward of the vehicle 1. An optical axis A (see FIG. 4) of the lens 15 inclines forward and laterally outward in a plan view. An optical axis angle $\theta$ (see FIG. 5), which is the inclination angle of the optical axis A of the lens 15 with respect to the front-and-rear direction, is set, for example, between 30 degrees and 60 degrees. A harness 17 is connected to the above-mentioned terminal of the imaging device 12. As shown in FIG. 3, the harness 17 penetrates through the grommet 7 attached to the through hole 6 of the roof rail 4 and is arranged below the roof rail 4.

Hereinafter, the direction parallel to the optical axis A of the lens 15 and going forward and laterally outward of the vehicle 1 is defined as an outboard direction, and the tip side in the outboard direction is defined as an outboard side. Similarly, the direction parallel to the optical axis A of the lens 15 and going rearward and laterally inward of the vehicle 1 (i.e., the direction opposite to the outboard direction) is defined as an inboard direction, and the tip side in the inboard direction is defined as an inboard side. Further, the outboard direction and the inboard direction are collectively referred to as simply the inboard and outboard direction.

As shown in FIGS. 2 and 3, the housing 13 includes a sidewall 19 having a substantially rectangular tubular shape and extending upward from the roof panel 5, and an upper wall 23 having a substantially rectangular plate shape and arranged at an upper end of the sidewall 19. The sidewall 19 and the upper wall 23 define a space S inside the housing 13. The imaging device 12 is accommodated in this space S.

The sidewall 19 may be formed integrally with the roof panel 5, or may be formed separately from the roof panel 5. The sidewall 19 includes a front portion 25 facing substantially forward, a side portion 27 facing substantially laterally outward, and a circumferential wall 21 provided between the front portion 25 and the side portion 27 and arranged around the lens 15.

The circumferential wall 21 has a circular shape when viewed from the outboard side. A through hole 28 penetrating in the inboard and outboard direction is formed in the circumferential wall 21. The through hole 28 is arranged around the lens 15.

As shown in FIG. 4, the circumferential wall 21 includes a front wall 29 arranged forward of the optical axis A of the lens 15 in the plan view, and a rear wall 30 arranged rearward of the optical axis A of the lens 15 in the plan view. The front wall 29 constitutes a portion of the circumferential wall 21 provided on the side of the front portion 25, and the rear wall 30 constitutes a portion of the circumferential wall 21 provided on the side of the side portion 27. In the plan view, the front wall 29 and the rear wall 30 are curved in an arc shape toward the outboard side.

A protrusion 31 protruding toward the outboard side is formed in the front wall 29. More specifically, the protrusion 31 protrudes from the surface of the front wall 29 on the outboard side toward the outboard side. It is preferable that the protrusion 31 is arranged so as not to interfere with the field of view (FoV) of the imaging device 12. As shown in FIG. 2, the protrusion 31 is curved in an arc shape centered on the optical axis A of the lens 15 when viewed from the outboard side. The tip of the protrusion 31 on the outboard side is arranged on the most outboard side of the front wall 29. Hereinafter, the tip of the protrusion 31 on the outboard side will be referred to as "the tip 29A of the front wall 29 on the outboard side."

As shown in FIG. 3, the fixed member 14 includes an upper bracket 33 fixed to the housing 13, a lower bracket 35 arranged below the upper bracket 33 and fixed to the imaging device 12, and a fastener 36 that fastens the upper bracket 33 and the lower bracket 35 to each other.

The upper bracket 33 is formed of a metal plate-like member. The upper bracket 33 includes a main portion 37 extending along the lower surface of the upper wall 23 of the housing 13, a leg portion 38 extending downward from the end of the main portion 37, and a bent portion 39 bent horizontally from the lower end of the leg portion 38.

The upper surface of the main portion 37 of the upper bracket 33 is adhered to the lower surface of the upper wall 23 of the housing 13, for example by an adhesive. Accordingly, the upper bracket 33 is fixed to the housing 13.

The bent portion 39 of the upper bracket 33 faces the upper wall 23 of the housing 13 in the up-and-down direction with a gap therebetween. A plurality of fastening holes 39A (only one of which is shown in FIG. 3) penetrating in the up-and-down direction is formed in the bent portion 39.

The lower bracket 35 is formed of a plate-shaped member. The lower bracket 35 includes a main portion 40 facing the inboard and outboard direction, a leg portion 41 extending from a portion of the edge of the main portion 40 toward the inboard side, and a bent portion 42 bent horizontally from the upper end of the leg portion 41. The imaging device 12 may be fixed to the main portion 40 of the lower bracket 35 by a fastener, such as a bolt.

A plurality of fastening holes 42A (only one of which is shown in FIG. 3) penetrating in the up-and-down direction is formed in the bent portion 42 of the lower bracket 35. A central axis of each fastening hole 42A formed in the bent portion 42 of the lower bracket 35 is aligned with the central axis of the corresponding fastening hole 39A formed in the bent portion 39 of the upper bracket 33.

The fastener 36 includes a plurality of weld nuts 44 (only one of which is shown in FIG. 3) provided on the upper surface of the bent portion 39 of the upper bracket 33, and a plurality of bolts 45 (only one of which is shown in FIG. 3) penetrating each fastening hole 39A of the upper bracket 33 and each fastening hole 42A of the lower bracket 35. Each bolt 45 is screwed into the corresponding weld nut 44, thereby fastening the upper bracket 33 and the lower bracket 35 to each other. Accordingly, the imaging device 12 is fixed to the housing 13 via the fixed member 14.

Figure 5:
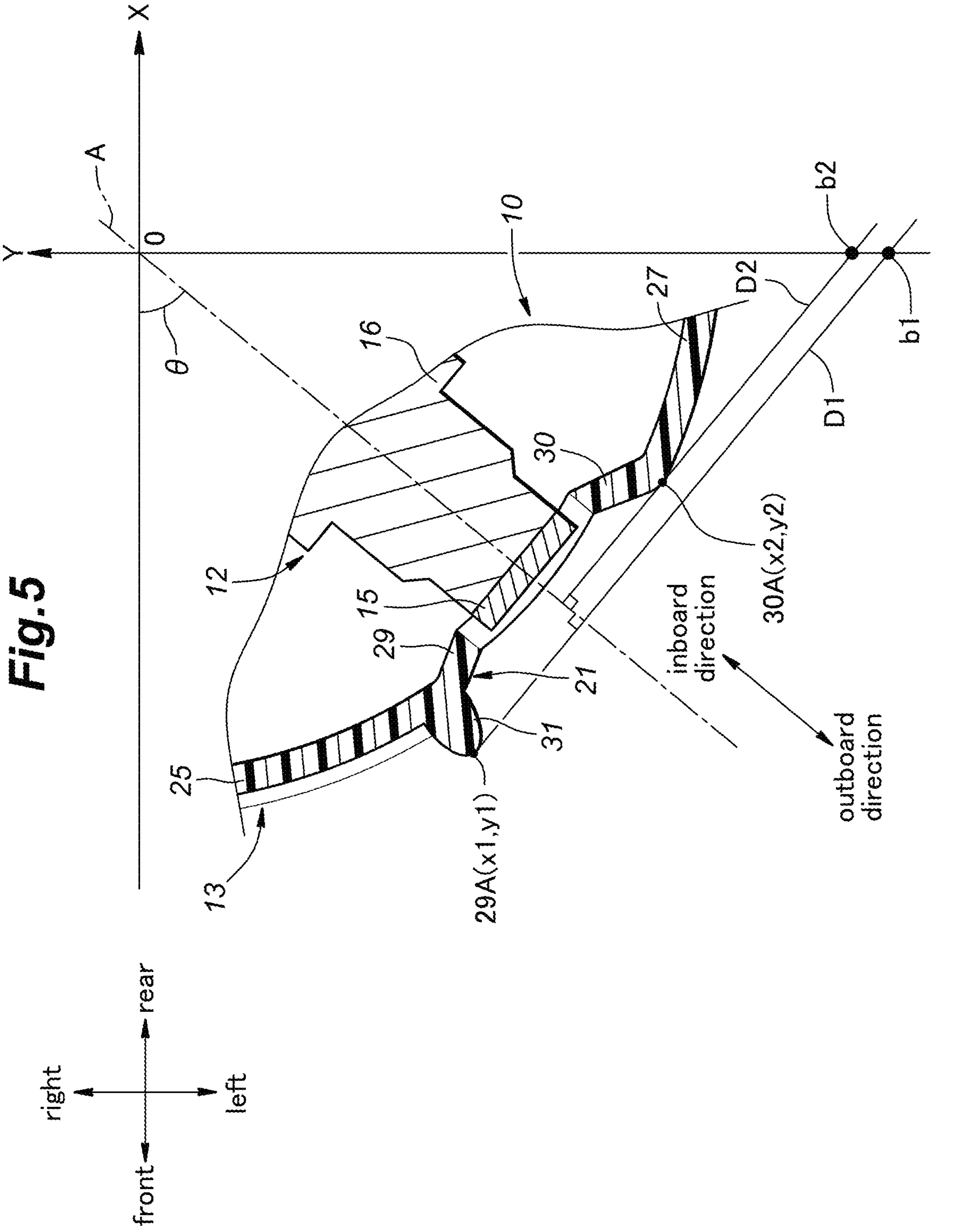
FIG. 5 is a plan cross-sectional view showing a relationship between a tip of a front wall on an outboard side and a tip of a rear wall on the outboard side in the attachment structure of the imaging device according to the first embodiment.

As shown in FIGS. 4 and 5, in the attachment structure 10, the tip 29A of the front wall 29 on the outboard side is arranged on the outboard side relative to the tip 30A of the rear wall 30 on the outboard side in the plan view. More specifically, a first plane D1 (see FIG. 5) that is perpendicular to the optical axis A of the lens 15 and passes through the tip 29A of the front wall 29 on the outboard side is arranged on the outboard side relative to a second plane D2 (see FIG. 5) that is perpendicular to the optical axis A of the lens 15 and passes through the tip 30A of the rear wall 30 on the outboard side.

As shown in FIG. 5, in a Cartesian coordinate system with the front-and-rear direction as the X-axis and the lateral direction as the Y-axis, the coordinates of the tip 29A of the front wall 29 on the outboard side are defined as (x1, y1), and the coordinates of the tip 30A of the rear wall 30 on the outboard side are defined as (x2, y2). Further, "θ" in the figure represents the optical axis angle θ mentioned above.

A horizontal line that is perpendicular to the optical axis A of the lens 15 and passes through the tip 29A of the front wall 29 on the outboard side (i.e., a horizontal line in the first plane D1) is expressed by the following formula (1).

$$Y=\tan(\theta+90°)\cdot X+b1 \tag{1}$$

Here, "tan (θ+90°)" represents the inclination of this line, and "b1" represents the intercept of this line on the Y-axis. By substituting the coordinates (x1, y1) of the tip 29A of the front wall 29 on the outboard side for (X, Y) of the above formula (1), the following formula (2) is acquired.

$$y1=\tan(\theta+90°)\cdot x1+b1 \tag{2}$$

A horizontal line that is perpendicular to the optical axis A of the lens 15 and passes through the tip 30A of the rear wall 30 on the outboard side (i.e., a horizontal line in the second plane D2) is expressed by the following formula (3).

$$Y=\tan(\theta+90°)\cdot X+b2 \tag{3}$$

Here, "tan (θ+90°)" represents the inclination of this line, and "b2" represents the intercept of this line on the Y-axis. By substituting the coordinates (x2, y2) of the tip 30A of the rear wall 30 on the outboard side for (X, Y) of the above formula (3), the following formula (4) is acquired.

$$y2=\tan(\theta+90°)\cdot x2+b2 \tag{4}$$

When the vehicle 1 is moving, a travel wind caused by the movement of the vehicle 1 may hit the circumferential wall 21 (remain at the circumferential wall 21) provided in the sidewall 19 of the housing 13, generating so-called wind noises. More specifically, the travel wind becomes a vortex at the front wall 29 of the circumferential wall 21, and this vortex remains at a portion of the rear wall 30 of the circumferential wall 21. At this time, fluctuations in air pressure occur, causing the air to vibrate and generate the wind noises. In order to suppress the wind noises, the tip 29A of the front wall 29 on the outboard side needs to be arranged on the outboard side relative to the tip 30A of the rear wall 30 on the outboard side in the plan view. In other words, the first plane D1 needs to be arranged on the outboard side relative to the second plane D2. Accordingly, the following formula (5) is satisfied.

$$|b1|-|b2|>0 \tag{5}$$

From the above formulae (2), (4), and (5), the following formula (6) is acquired.

$$\left|y1-\tan(\theta+90^\circ)\cdot x1\right|-\left|y2-\tan(\theta+90^\circ)\cdot x2\right|>0 \tag{6}$$

In the plan view, in a case where the tip 29A of the front wall 29 on the outboard side is arranged on the inboard side relative to the tip 30A of the rear wall 30 on the outboard side (in a case where $|b1|-|b2|\leq 0$), the air that has separated from the front wall 29 (the vortex generated at the front wall 29) is likely to remain at the rear wall 30. This makes the wind noises more likely to occur. However, by providing a positional difference between the front wall 29 and the rear wall 30 as in the formula (6) (the tip 29A of the front wall 29 on the outboard side is arranged on the outboard side relative to the tip 30A of the rear wall 30 on the outboard side in the plan view), the air that has separated from the front wall 29 is less likely to remain at the rear wall 30, which is advantageous in reducing wind noises.

In the above attachment structure 10, even if a vortex is generated at the front wall 29 of the circumferential wall 21 due to the travel wind generated by the movement of the vehicle 1, this vortex is less likely to hit the rear wall 30 of the circumferential wall 21. Accordingly, the generation of the wind noises caused by the travel wind can be suppressed.

Since the protrusion 31 protruding toward the outboard side is formed in the front wall 29, the tip 29A of the front wall 29 on the outboard side protrudes significantly toward the outboard side relative to the tip 30A of the rear wall 30 on the outboard side. Further, the protrusion 31 is curved in an arc shape centered on the optical axis A of the lens 15 when viewed from the outboard side, and is therefore provided over a wider range of the front wall 29. Accordingly, even if a vortex is generated at the front wall 29 of the circumferential wall 21 due to the travel wind, this vortex is less likely to hit the rear wall 30 of the circumferential wall 21. Accordingly, the generation of the wind noises caused by the travel wind can be more effectively suppressed.

The Second Embodiment

An attachment structure 100 according to the second embodiment will be described with reference to FIGS. 6 and 7. The attachment structure 100 according to the second embodiment is different from the attachment structure 10 according to the first embodiment only in the shape of the protrusion 101 provided in the front wall 29. The differences from the first embodiment will be described below. Elements that are the same as or similar to those in the first embodiment are given the same reference numerals, and duplicated explanations will be omitted.

Figure 6:
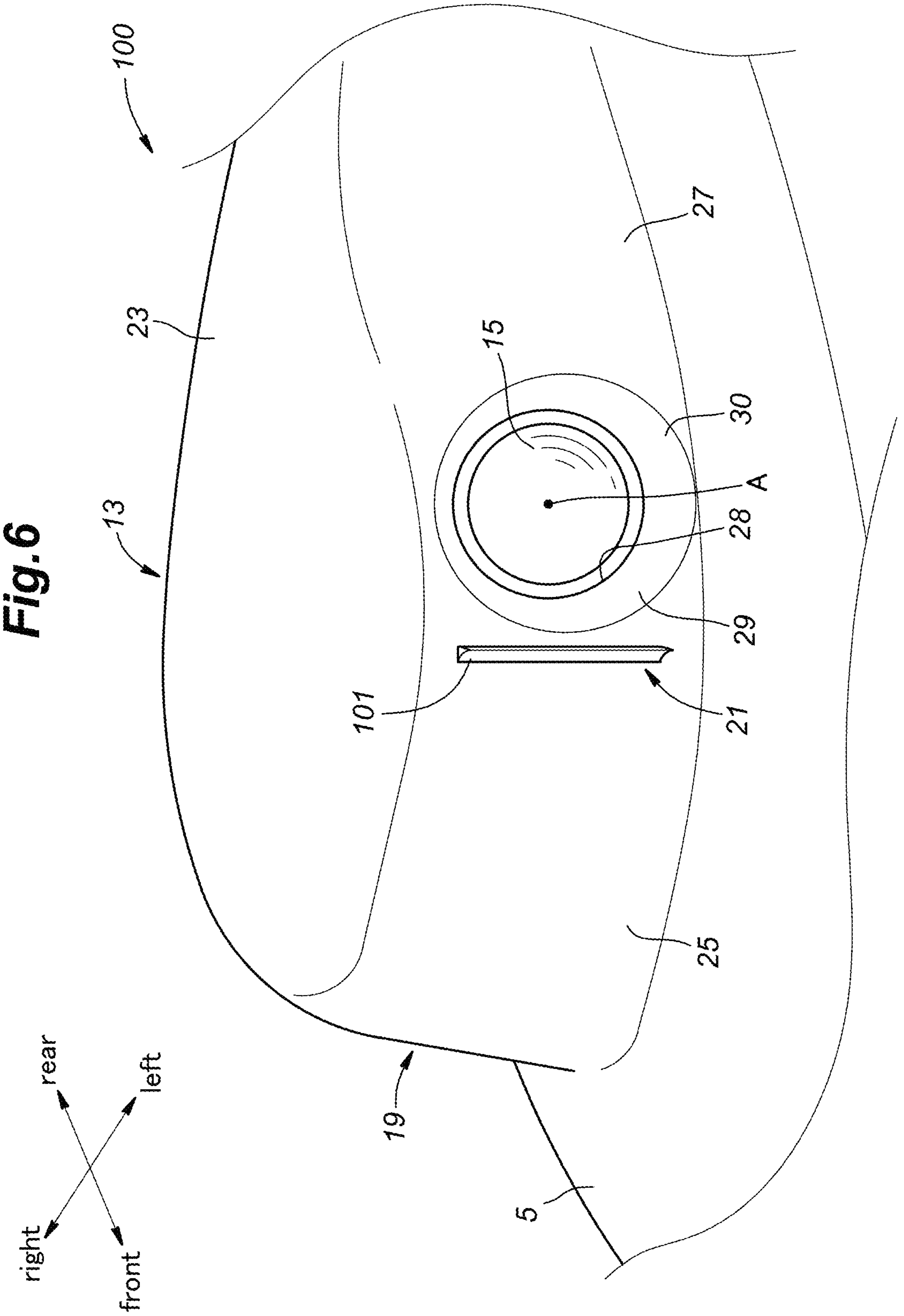
FIG. 6 is a perspective view showing an attachment structure of an imaging device according to the second embodiment.
Figure 7:
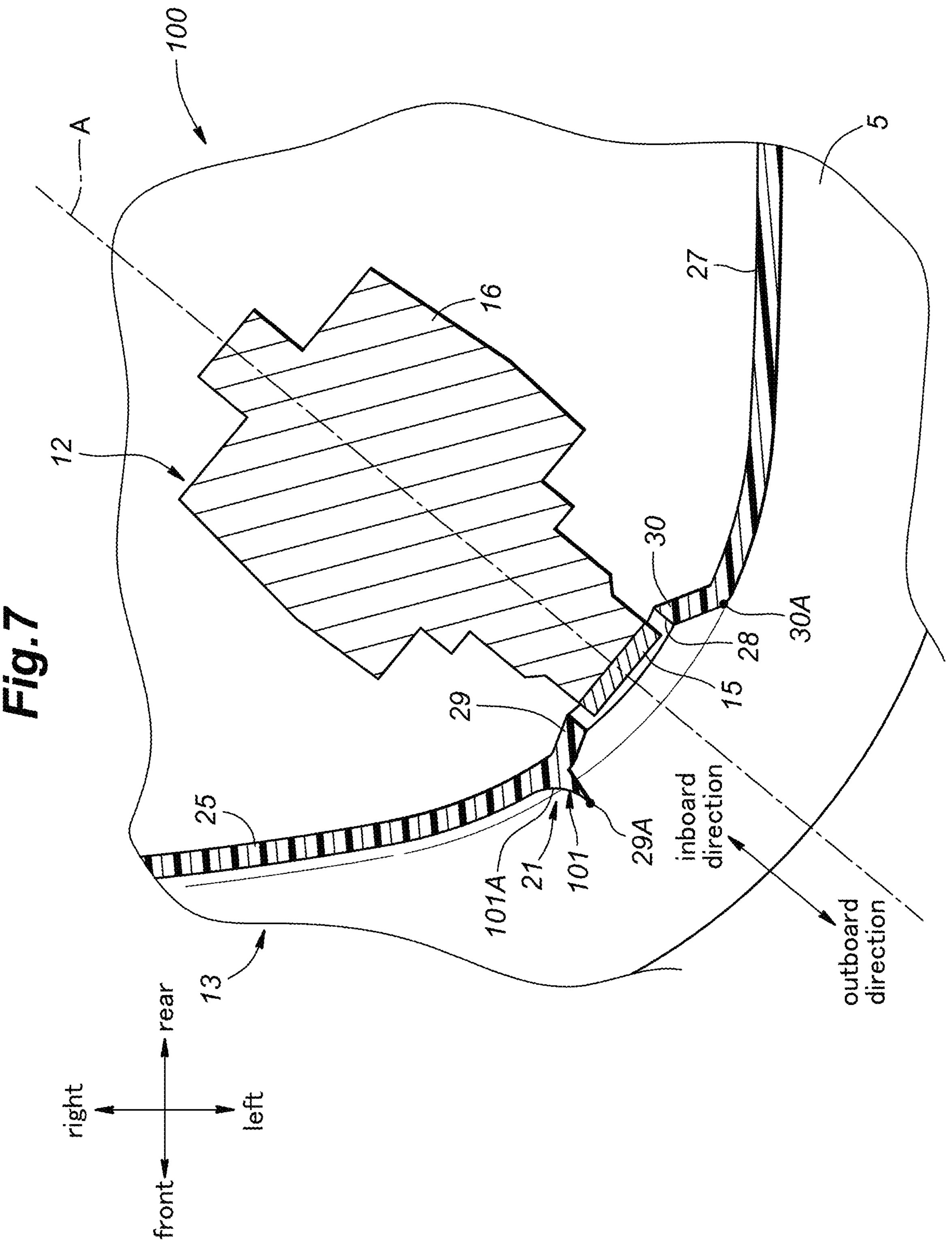
FIG. 7 is a plan cross-sectional view of a main portion (when viewed from above) of the attachment structure of the imaging device according to the second embodiment.

As shown in FIG. 6, the protrusion 101 linearly extends in the up-and-down direction when viewed from the outboard side. As shown in FIG. 7, the front surface 101A of the protrusion 101 is curved so as to be convex toward the rear in the plan view. Accordingly, the travel wind is more likely to flow to the outboard side along the front surface 101A of the protrusion 101, so that even if a vortex is generated at the front wall 29 of the circumferential wall 21 due to the travel wind, this vortex is less likely to hit the rear wall 30 of the circumferential wall 21. Accordingly, the generation of the wind noises caused by the travel wind can be more effectively suppressed.

The Third Embodiment

Figure 8:
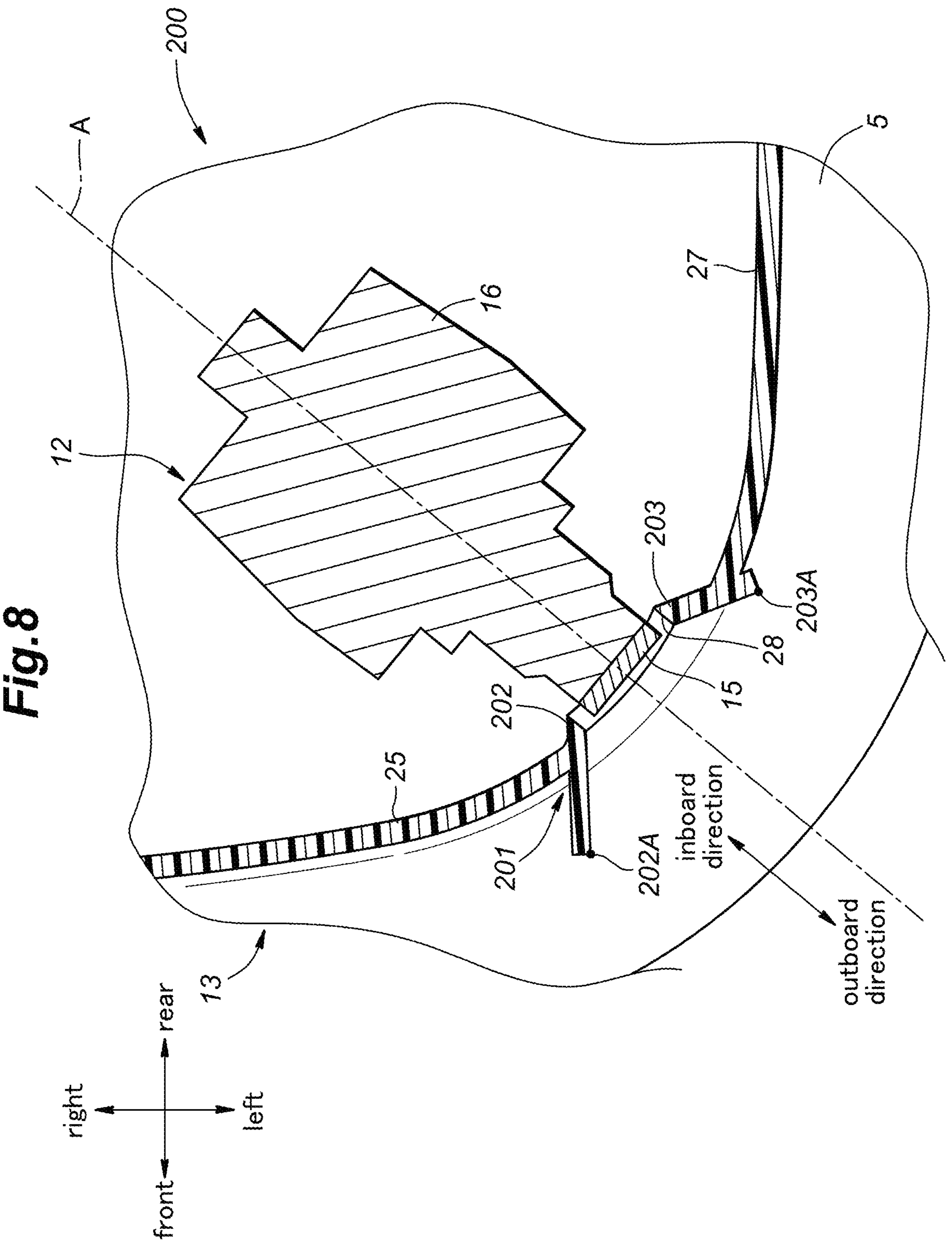
FIG. 8 is a plan cross-sectional view of a main portion (when viewed from above) of an attachment structure of an imaging device according to the third embodiment.

An attachment structure 200 according to the third embodiment will be described with reference to FIG. 8. The attachment structure 200 according to the third embodiment is different from the attachment structure 10 according to the first embodiment only in the shape of a circumferential wall 201. The differences from the first embodiment will be described below. Elements that are the same as or similar to those in the first embodiment are given the same reference numerals, and duplicated explanations will be omitted.

The circumferential wall 201 protrudes toward the outboard side and in a circular shape centered on the optical axis A of the lens 15. The circumferential wall 201 includes a front wall 202 arranged forward of the optical axis A of the lens 15 in the plan view, and a rear wall 203 arranged rearward of the optical axis A of the lens 15 in the plan view. A tip 202A of the front wall 202 of the circumferential wall 201 on the outboard side protrudes toward the outboard side with respect to the front portion 25 of the housing 13. Further, a tip 203A of the rear wall 203 of the circumferential wall 201 on the outboard side protrudes toward the outboard side with respect to the side portion 27 of the housing 13. At this time, the tip 202A of the front wall 202 on the outboard side is arranged on the outboard side with respect to the tip 203A of the rear wall 203 on the outboard side. Accordingly, even if a vortex is generated at the front wall 202 of the circumferential wall 201 due to the travel wind, the vortex is less likely to hit the rear wall 203 of the circumferential wall 201.

The Fourth Embodiment

Figure 9:
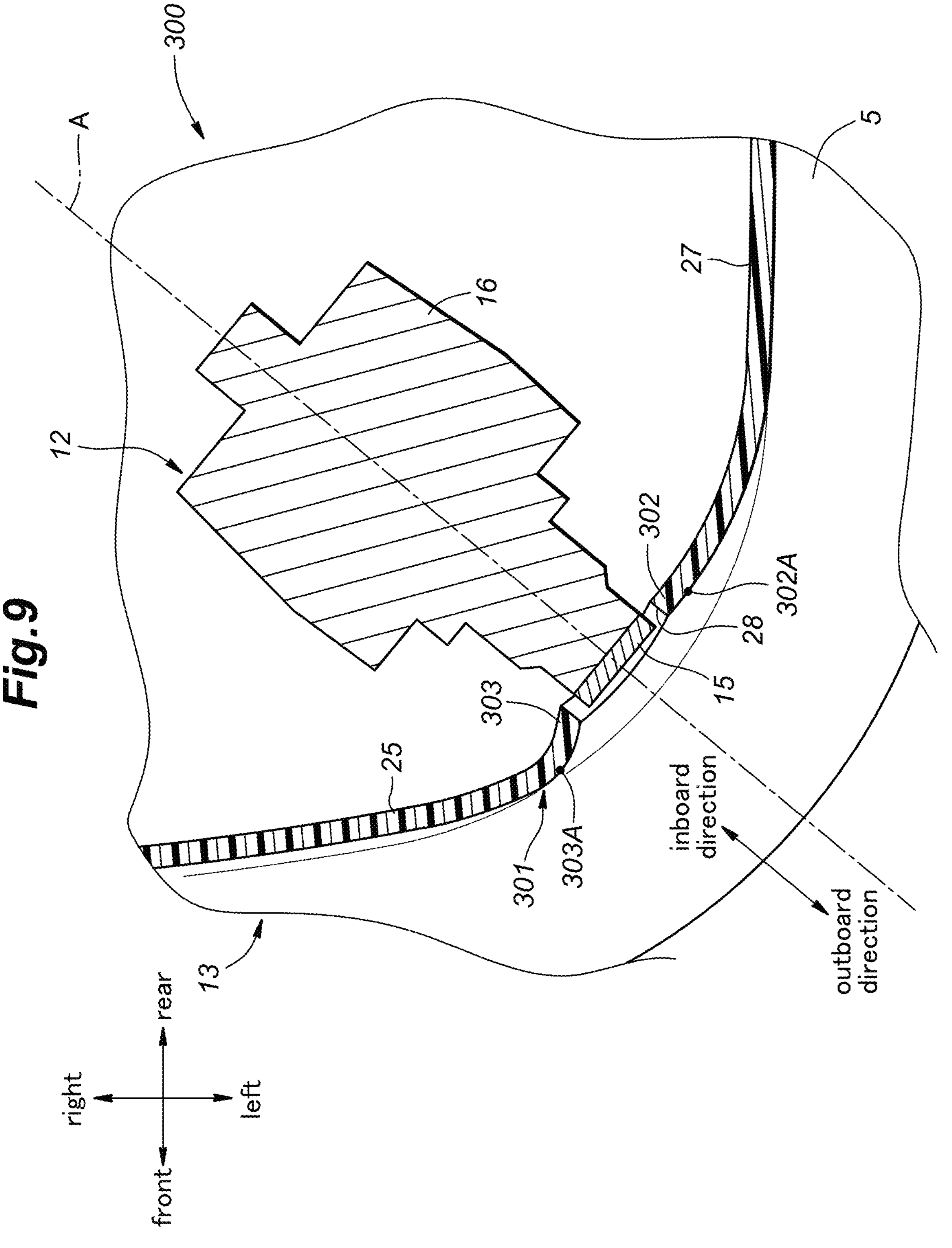
FIG. 9 is a plan cross-sectional view of a main portion (when viewed from above) of an attachment structure of an imaging device according to the fourth embodiment.

An attachment structure 300 according to the fourth embodiment will be described with reference to FIG. 9. The attachment structure 300 according to the fourth embodiment is different from the attachment structure 10 according to the first embodiment only in the shape of a circumferential wall 301. The differences from the first embodiment will be described below. Elements that are the same as or similar to those in the first embodiment are given the same reference numerals, and duplicate explanations will be omitted.

The circumferential wall 301 includes a front wall 303 arranged forward of the optical axis A of the lens 15 in the plan view, and a rear wall 302 arranged rearward of the optical axis A of the lens 15 in the plan view. In the plan view, the front wall 303 and the rear wall 302 are curved in an arc shape toward the outboard side. The radius of curvature of the rear wall 302 of the circumferential wall 301 is greater than the radius of curvature of the front wall 303 of the circumferential wall 301. Accordingly, with a simple configuration, a tip 303A of the front wall 303 on the outboard side is arranged on the outboard side with respect to a tip 302A of the rear wall 302 on the outboard side. Accordingly, the generation of the wind noises caused by the travel wind can be suppressed.

Concrete embodiments of the present invention have been described in the foregoing, but the present invention should not be limited by the foregoing embodiments and various modifications and alterations are possible within the scope of the present invention. In the first embodiment, one protrusion 31 is provided in the front wall 29, but for example, a plurality of protrusions 31 may be spaced apart from each other. In the first embodiment, the protrusion 31 is rod-shaped, but the shape of the protrusion 31 is not particularly limited, and for example, the protrusion 31 may be formed in a hemispherical shape.

The invention claimed is:

1. An attachment structure of an imaging device, comprising:

the imaging device installed on a roof of a vehicle; and a housing that accommodates at least a portion of the imaging device, wherein the imaging device includes a lens that faces forward and laterally outward of the vehicle, the housing includes a circumferential wall arranged around the lens, the circumferential wall includes:

a front wall arranged forward of an optical axis of the lens in a plan view; and a rear wall arranged rearward of the optical axis of the lens in the plan view, and in a case where a direction parallel to the optical axis of the lens and going forward and laterally outward of the vehicle is defined as an outboard direction and a tip side in the outboard direction is defined as an outboard side, a tip of the front wall on the outboard side is arranged on the outboard side relative to a tip of the rear wall on the outboard side in the plan view.

2. The attachment structure of the imaging device according to claim 1, wherein the front wall is provided with a protrusion that protrudes toward the outboard side.

3. The attachment structure of the imaging device according to claim 2, wherein the protrusion is curved in an arc shape centered on the optical axis of the lens when viewed from the outboard side.

4. The attachment structure of the imaging device according to claim 2, wherein the protrusion extends linearly in an up-and-down direction when viewed from the outboard side.

5. The attachment structure of the imaging device according to claim 4, wherein a front surface of the protrusion is curved so as to be convex toward a rear in the plan view.

6. The attachment structure of the imaging device according to claim 1, wherein the circumferential wall protrudes toward the outboard side and in a circular shape centered on the optical axis of the lens.

7. The attachment structure of the imaging device according to claim 1, wherein the front wall and the rear wall are curved in an arc shape toward the outboard side in the plan view, and a radius of curvature of the rear wall is greater than a radius of curvature of the front wall.

8. The attachment structure of the imaging device according to claim 1, wherein in a case where a plane that is perpendicular to the optical axis of the lens and passes through the tip of the front wall on the outboard side is defined as a first plane, and a plane that is perpendicular to the optical axis of the lens and passes through the tip of the rear wall on the outboard side is defined as a second plane, the first plane is arranged on the outboard side relative to the second plane.

* * * * *